Oct. 4, 1927.
J. A. BRIERE
1,644,008
REVERSE SIGNAL CIRCUIT CLOSER FOR MOTOR VEHICLES
Filed April 7, 1926
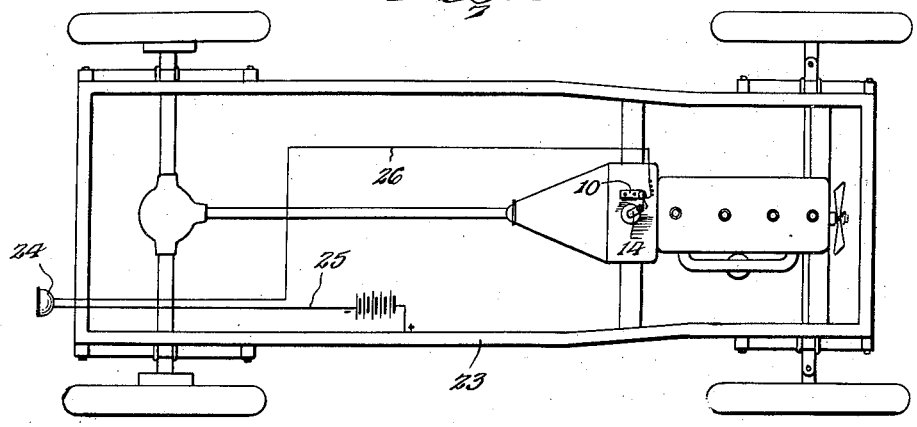
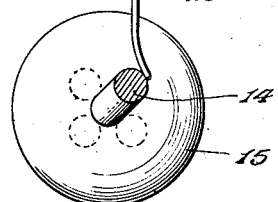
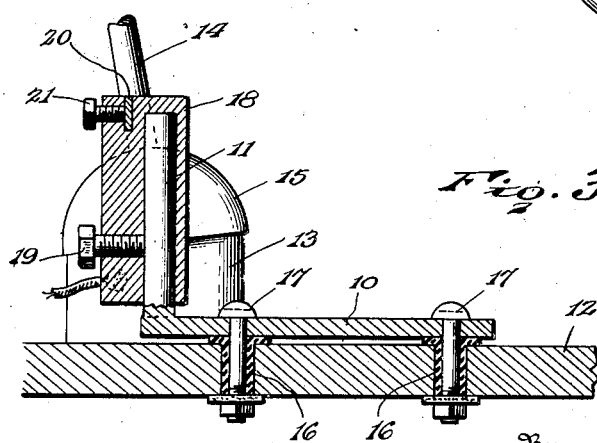
Inventor
J. A. Briere.
By Lacey & Lacey, Attorneys Patented Oct. 4, 1927.

1,644,008

UNITED STATES PATENT OFFICE.

JOSEPH A. BRIERE, OF LAKE LINDEN, MICHIGAN.

REVERSE-SIGNAL-CIRCUIT CLOSER FOR MOTOR VEHICLES.

Application filed April 7, 1926. Serial No. 100,391.

This invention relates to an improved rear view light for motor vehicles and seeks, among other objects, to provide a mechanism whereby, when the transmission of a vehicle is shifted into reverse for backing the vehicle, a circuit will be closed through a lamp at the rear of the vehicle so that the lamp will be energized for illuminating the roadway and thereby facilitating the backing of the vehicle.

A further object of the invention is to provide an improved switch member for controlling the energization of the rear view lamp.

And the invention seeks, as a still further object, to provide a switch member which may be readily mounted upon motor vehicles as now in service and which will be well adapted for use in connection with gear shift levers as at present prevalently employed.

Other objects of the invention not specifically mentioned in the foregoing will appear during the course of the following description.

In the accompanying drawings:

Figure 1 is a plan view more or less diagrammatically showing the present invention applied.

Figure 2 is a plan view particularly showing the switch in conjunction with the gear shift lever of the vehicle.

Figure 3 is a vertical longitudinal sectional view on the line 3—3 of the Figure 2, looking in the direction indicated by the arrows.

In carrying the invention into effect, I employ a switch member including an angle-shaped bracket which embodies a flat base plate 10, and rising from said plate at one end thereof is a preferably cylindrical post 11. In practice, the bracket is, as shown in Figure 3 of the drawings, preferably mounted upon the floor 12 of a vehicle adjacent the gear shift lever socket 13. In the present instance, this socket is conventionally shown and mounts the gear shift lever 14 which is provided with a hood 15 overlying the socket. Insulating bushings 16 are preferably employed to extend through the floor 12, and extending through the base plate 10 of the bracket and through said bushings is a pair of bolts 17 rigidly connecting the bracket with the floor. The post 11 of the bracket is of a length to project above the socket 13 of the lever 14, and mounted on said post is a preferably cylindrical metallic block 18 having an eccentrically located bore slidably receiving the post, the bore being closed at its upper end. The block carries a set bolt 19 to engage the post so that, as will be appreciated, the block may be adjusted vertically upon the post and secured in adjusted position, and fitting at one end in a transverse slot in the upper end of the block is a spring contact finger 20 preferably curved at its free end. The finger is located at the side of the axis of the block opposite the bore which accommodates the post 11, and mounted upon the block to engage the inner end of said finger is a set bolt 21 rigidly securing the finger in place. As will be seen, the finger may be adjusted upon the block to vary the effective length of the finger and secured in adjusted position by means of the set bolt, and, as best brought out in Figure 2 the finger is so arranged that when the gear shift lever 14 is rocked to shift the reverse gear of the vehicle transmission so that the vehicle may be backed, said lever will engage the free end of said finger. Mounted upon the block 18 near its lower end is a terminal binding screw 22.

Figure 1 shows the chassis 23 of the vehicle, and suitably mounted at the rear of the chassis is a lamp 24 preferably of the character illustrated in my co-pending application for rear view light for motor vehicles, filed June 5, 1925, Serial No. 35,192. As shown, one side of the vehicle battery is grounded to the chassis frame and leading from the other side of the battery to the lamp 24 is a wire 25 while a wire 26 extends from the lamp and is connected to the binding screw 22. Accordingly, as will now be appreciated, when the gear shift lever 14 is rocked for shifting the reverse gear of the vehicle transmission, as previously described, and is thus moved into engagement with the contact finger 20, a circuit will be closed from the vehicle battery through the wire 25, lamp 24, thence through the wire 26, the block 18, the finger 20, and the gear shift lever to return to the battery through the chassis frame. Accordingly, the lamp will be energized for illuminating the roadway in the rear of the vehicle so that the vehicle may be safely backed. I accordingly provide a particularly effective mechanism for the purpose set forth and since the block 18 may be adjusted on the post 11 for varying the height of the contact finger 20 while the finger may be independently adjusted on the block to vary the effective length thereof, the device may be readily applied and suited to the requirements of different makes of motor vehicles as now on the market.

Having thus described the invention, what I claim is:

1. A switch member including a bracket for attachment to a vehicle and including an upstanding post adjacent a gear shift lever of the vehicle, a block mounted upon the bracket and adjustable vertically and circumferentially thereof, means for releasably securing said block in a set position upon the post, a contact finger carried by the block and projecting transversely therefrom for engagement by said lever when moved to one of its operative positions for closing a circuit through said finger, the finger being adjustable transversely of the block for varying the effective length of said finger, and means for locking the finger in adjusted position.

2. A switch member including an angle-shaped bracket for attachment to a vehicle adjacent the gear shift lever of the vehicle and embodying an upstanding post, a block eccentrically bored to rotatably and slidably fit upon said post, means for releasably locking the block in a set position upon the post, the block being provided with a transverse slot, a contact finger fitting in said slot and extending transversely therefrom for engagement by said lever when moved to one of its operative positions for closing a circuit through the finger, and means for releasably locking the finger in the slot of said block.

3. A switch member including a bracket adapted to be attached to a vehicle in insulated relation thereto adjacent a gear shift lever of the vehicle and embodying an upstanding post circular in cross section, a block provided with an eccentrically located bore circular in cross section and slidably and rotatably accommodating said post, means for locking the block in a set position upon the post, the block being provided at its upper end with a transversely extending slot located at the side of the axis of the block opposite said bore, a contact finger having one end portion fitted into said slot and extending transversely therefrom with its opposite end disposed for engagement by said lever when moved to one of its operative positions for closing a circuit through said finger, and means for releasably locking the finger in said slot.

In testimony whereof I affix my signature.

JOSEPH A. BRIERE. [L. S.]